United States Patent [19]

Chamberlain

[11] 4,140,198

[45] Feb. 20, 1979

[54] BRAKE LUBRICATION AND COOLING SYSTEM

[75] Inventor: Richard W. Chamberlain, Aurora, Ill.

[73] Assignee: Caterpillar Tractor Co., Peoria, Ill.

[21] Appl. No.: 879,305

[22] Filed: Feb. 21, 1978

[51] Int. Cl.² ............................................. F16D 55/02
[52] U.S. Cl. .................................. 180/75; 188/264 D; 188/71.6; 301/6 CF
[58] Field of Search ........... 188/264 R, 264 B, 264 D, 188/264 P, 71.6; 180/75, 88; 301/6 CF, 6 D; 192/4 R

[56] References Cited

U.S. PATENT DOCUMENTS

| 2,955,682 | 10/1960 | Kelley et al. | 188/71.6 X |
|---|---|---|---|
| 3,033,329 | 5/1962 | Malloy | 188/71.6 X |
| 3,071,211 | 1/1963 | Wrigley | 188/264 P X |
| 3,095,762 | 7/1963 | Baker | 180/75 X |
| 3,303,911 | 2/1967 | Hause et al. | 188/264 P |
| 3,321,999 | 5/1967 | Greer | 188/264 B X |
| 3,586,134 | 6/1971 | Westfall | 188/71.6 |
| 3,730,301 | 5/1973 | Heck et al. | 188/71.6 |
| 3,907,073 | 9/1975 | Harrison | 188/71.6 X |
| 3,999,634 | 12/1976 | Howell | 188/71.6 |
| 4,022,298 | 5/1977 | Malinowski | 188/71.6 |
| 4,113,067 | 9/1978 | Coons et al. | 188/71.6 |

Primary Examiner—Joseph F. Peters, Jr.
Assistant Examiner—Terrance L. Siemens
Attorney, Agent, or Firm—Sixbey, Bradford & Leedom

[57] ABSTRACT

A lubricating and cooling system for disc type brakes operatively positioned within a vehicle drive wheel, the system including means to increase oil flow to, through, and around brake disc packs situate in a region of restricted oil flow, the means including a vaned pump ring, partially submerged in oil, mounted for rotation with the wheel, and functionally operational to assure adequate pumping in each direction of rotation of the wheel.

26 Claims, 8 Drawing Figures

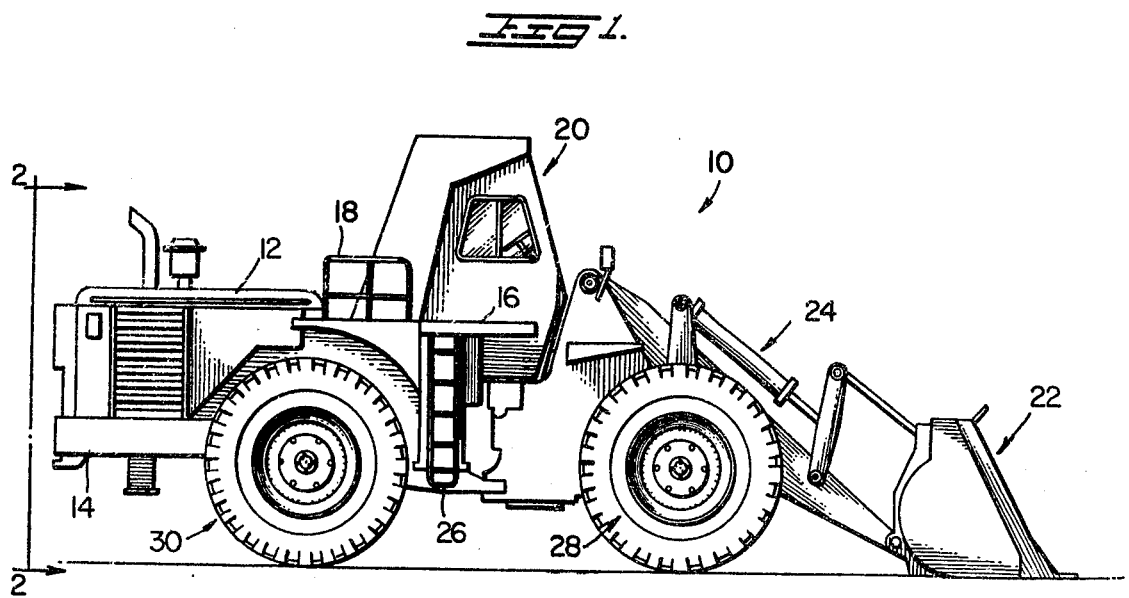
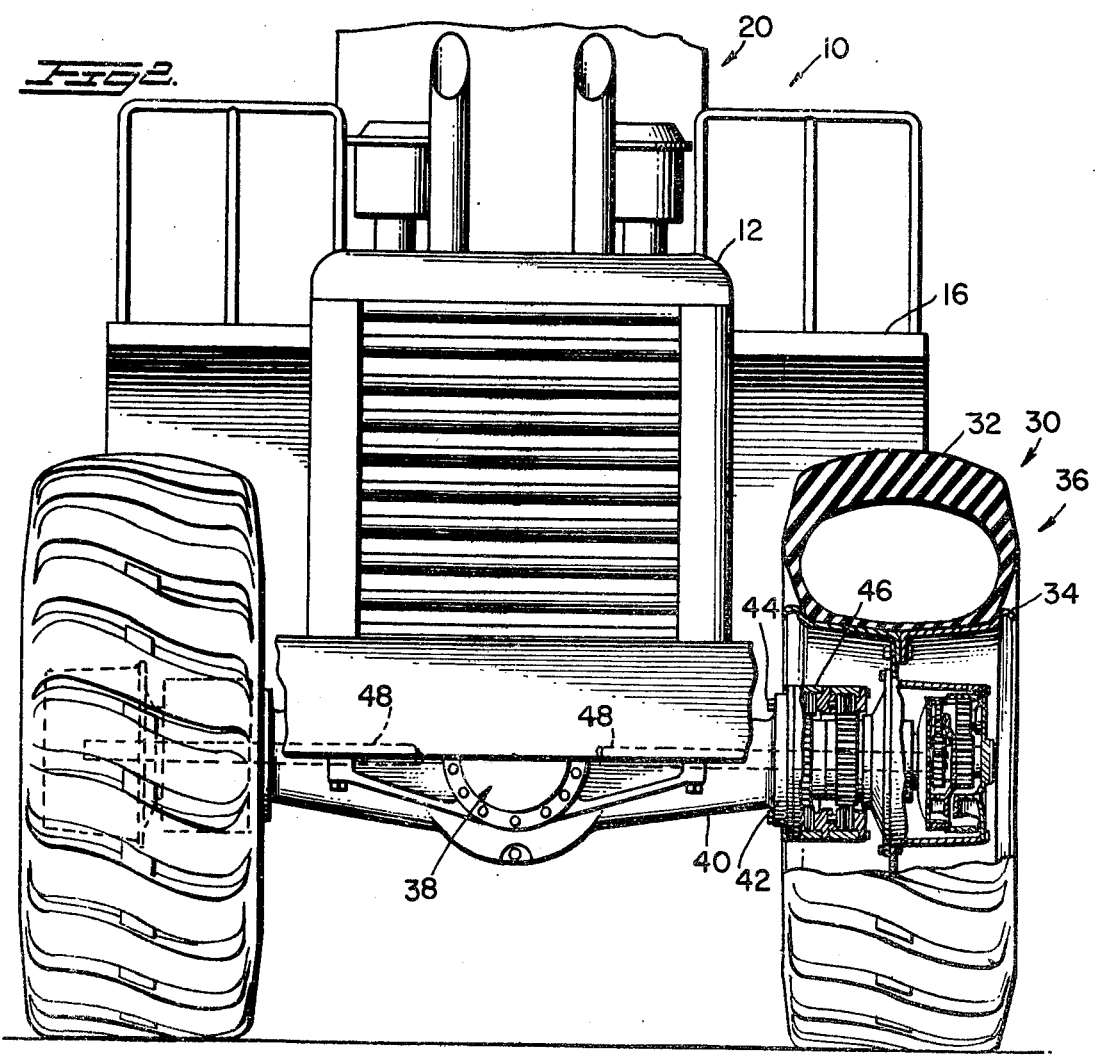

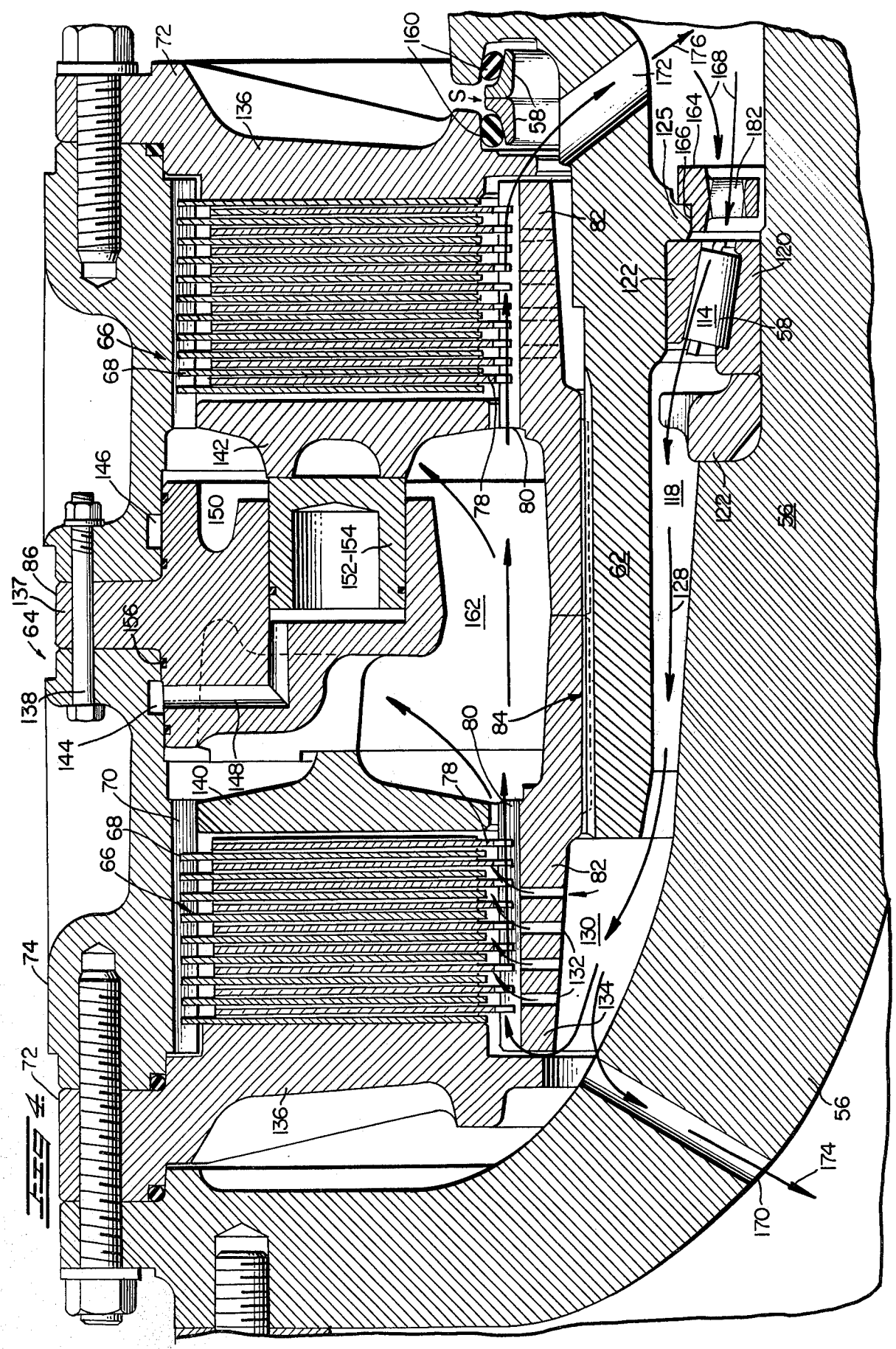

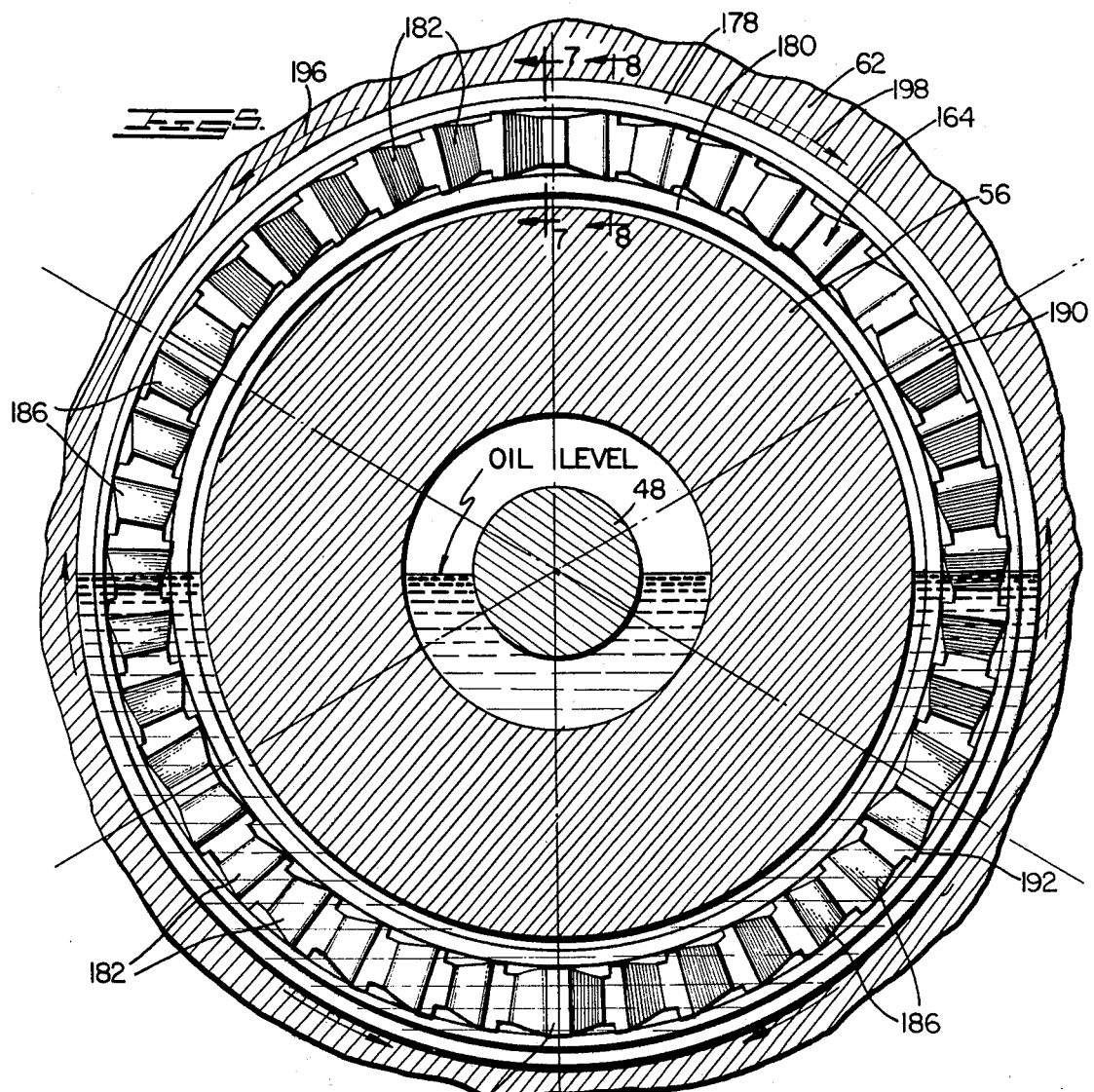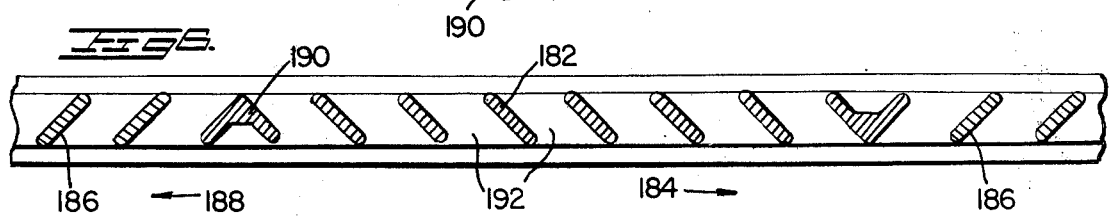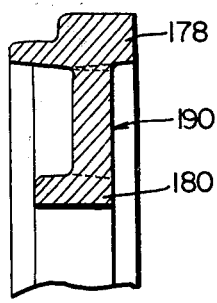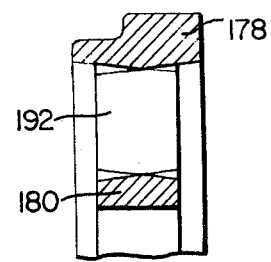

BRAKE LUBRICATION AND COOLING SYSTEM

BACKGROUND OF THE INVENTION

The present invention relates generally to wheeled vehicles, in the nature of heavy duty apparatus used for construction, earth working, earth moving and the like.

More specifically, the invention relates to a brake system, operatively mounted in the interior of a wheel incorporating a final drive in wheel loader vehicles, and the like, of substantial size, having large wheels thereon. The vehicles normally are moved at relatively slow operational speeds, but have high momentum forces created, and which must be overcome in braking and stopping such vehicles.

In vehicles of the type to which the present invention is applied, wheel final drive assemblies and braking systems for the vehicle have heretofore been incorporated positionally and operationally within a vehicle wheel hub. The brake systems in these vehicles have included oil flooded disc brake types. A brake system of this type is disclosed in U.S. Pat. No. 3,301,359, dated Jan. 31, 1967, entitled Braking Apparatus, and owned by the assignor of this application.

The braking mechanism and system disclosed in that patent, and other known similar systems, while proving effective in some vehicles, have disadvantages when used in vehicles of greatly increased size and weight, wherein the forces which must be overcome in braking of the vehicle require substantially greater braking forces and strengths. This has led to consideration of plural disc pack arrangements by the assignor company of this application, one structure of which is shown and described in detail in a copending application of the present inventor entitled a Double Disc-type Brake System, Ser. No. 879,306, filed Feb. 21, 1978, and assigned to a common assignee herewith.

In brake systems of the type disclosed in the aforesaid copending patent application, the braking arrangement in essence constitutes a double, back to back, disc pack arrangement, the actuating means being serially operable to initially actuate one disc pack, following an initial incremental actuation of the brake energizer or pedal, and subsequently, upon additional energization or movement of the pedal, initiating and implementing braking action in a second disc pack. This arrangement overcomes in part braking problems which arise in large and heavy wheeled units.

In some known systems, as also in the systems involved in larger and heavier vehicles of the type shown and described herein, additional problems have arisen, a very substantial one of which involves cooling and lubricating of the brake systems, and primarily the brake disc packs within the wheel of the wheel loader final drive. The larger the vehicle, the greater the force required to brake it, and the greater heat factor to be overcome.

Disc brakes of the type involved are normally of an oil flooded disc brake type, and the disc packs are enclosed within cavities or areas where it is difficult to circulate the cooling and lubricatng oils in adequate oil flow past the disc packs, without using external pumping means or the like.

It is an important object of the present invention to eliminate, insofar as possible, drawbacks existant in prior known and used apparatus.

Another important object of the present invention is to provide, in an oil flooded disc brake enclosed within the wheel of a wheel loader final drive, means to increase the oil flow internally so as to more effectively circulate the lubricating and cooling oil through and within cavities, and in such quantities past the disc packs, as to insure functional cooling and lubrication.

DESCRIPTION OF THE PRIOR ART

Heretofore, as above pointed out, braking systems in some wheeled vehicles have been placed within a wheel loader final drive wheel, and have included oil flooded disc brake types which have in certain vehicles proved satisfactory. It has been found however that with vehicles of increased size and weight, single disc brake constructions have been inadequate to provide the substantial forces required for braking of the vehicles. In order to alleviate these difficulties multiple pack disc brakes have been designed, and they have to some extent overcome some of the prior problems.

Such constructions however, sometimes involve a lubricating and cooling problem in brake operation due to size of the wheels, for example, and in some oil flooded disc brake types there is insufficient circulation of cooling and lubricating oil within cavities within which the disc brake packs are positioned, to insure optimum operational results. Some of the difficulty resides in the fact that in such systems the oil circulation is dependent to some extent on turbulence created within the oil reservoir or sump. The turbulence, created by virtue of rotation of the wheel about the spindle, is relied upon to circulate oil in sufficient amounts to the operating components in the braking system, and within the cavities wherein the braking system components are situate.

The turbulence created is diminished however in vehicles of the type in question, the wheels of which are of substantial diameter, and under most operating conditions the vehicle, because of weight, size etc., is moving at a relatively low speed. The dimensional size of the wheels results in a low rate of revolution and this diminishes to a substantial extent the turbulence of the oil within the sump or reservoir. The oil within the wheel normally has no flow by itself, and due partially to the decreased turbulence the necessary amount of lubrication and cooling is not available.

A further problem is encountered in that it is sometimes difficult to cause the cooling and lubricating oil to circulate within wheel cavities in which the oil flooded disc brake disc packs are situate, without providing external pumping means, which inherently involve problems of construction and operation.

SUMMARY OF THE INVENTION

The present invention is directed to a new and novel lubrication and cooling system for oil flooded disc brakes enclosed whithin the wheel of a wheel loader final drive, and particularly where the brake system is incorporated in vehicles having wheels of such substantial dimensions whereby rotation of the same in operation is slow, and therefore turbulence normally available in an oil sump or reservoir to distribute oil is not available or is substantially decreased.

The present invention incorporates, in a brake lubrication and cooling system, means to insure adequate oil flow past disc packs which are enclosed within cavities within the wheels. The means include an oil pump ring mounted for rotation with the wheel, and having a peripheral portion of the ring immersed in the oil reservoir. The pump ring has vanes operable to impart directional circulating forces to the oil to insure appropriate flow to the disc brake packs. The vanes of the ring are reversed in direction, approximately every 60° of circumference, so as to provide adequate pumping regardless of direction of rotation of the pump ring, which is governed by direction of rotation of the wheel with which associated.

According to the invention a rotating vaned pump ring is located in close proximity to the smaller diameter end of tapered roller bearings which are operationally positioned between and space a stationary axle shaft housing and rotating wheel hub. The vanes serve to positively guide and pump oil from a sump or reservoir through the space in the nature of a passage, into and through the tapered roller bearing, and into a cavity in proximity to the brake disc packs, from whence it can flow radially outwardly through radial holes into the disc packs positioned in a cavity, and cycle back to the reservoir through appropriate passageways or channels.

The vanes preferably are alternated in direction in segments of 45° to 60°, and therefore the pump ring functions in either direction of rotation of the wheel with which associated even though slow wheel rotation is encountered.

Another feature of the invention resides in the operation of the bearing, through which the oil is pumped by the pump ring, as a check valve to the periodically occuring non-pumping vane segments, to thereby diminish return flow tendency in this mode of ring operation.

Additional objects, features and advantages of the invention will be more readily apparent from the following detailed description of an embodiment thereof when taken together with the accompanying drawings in which:

FIG. 1 is a side elevational view of a wheeled vehicle, more particularly a front end loader of a type and size with which the present brake lubrication and cooling system is associated;

FIG. 2 is a fragmentary enlarged rear elevational view, with portions broken away, and in section, for clarity and disclosure, and with portions in broken lines to disclose structural association;

FIG. 4 is an enlarged fragmentary sectional view disclosing in greater detail the brake disc packs, and associated mechanics, for implementing the operation of the brake lubrication and cooling system, the oil flow path being indicated by arrows;

FIG. 5 is an enlarged view taken on line 5—5 of FIG. 3, showing in end elevation the vaned pump ring and associated mechanism;

FIG. 6 is a schematic cross-sectional view depicting structure and arrangement of the vanes of the pump ring;

FIG. 7 is a sectional view taken on line 7—7 of FIG. 5, being a section through a ring sector divider vane interposed between adjacent sets of oppositely directed vanes; and FIG. 8 is a view taken on line 8—8 of FIG. 5 showing in cross-section, and side elevational, one of the vanes on the pump ring.

DETAILED DESCRIPTION

Figure 3:
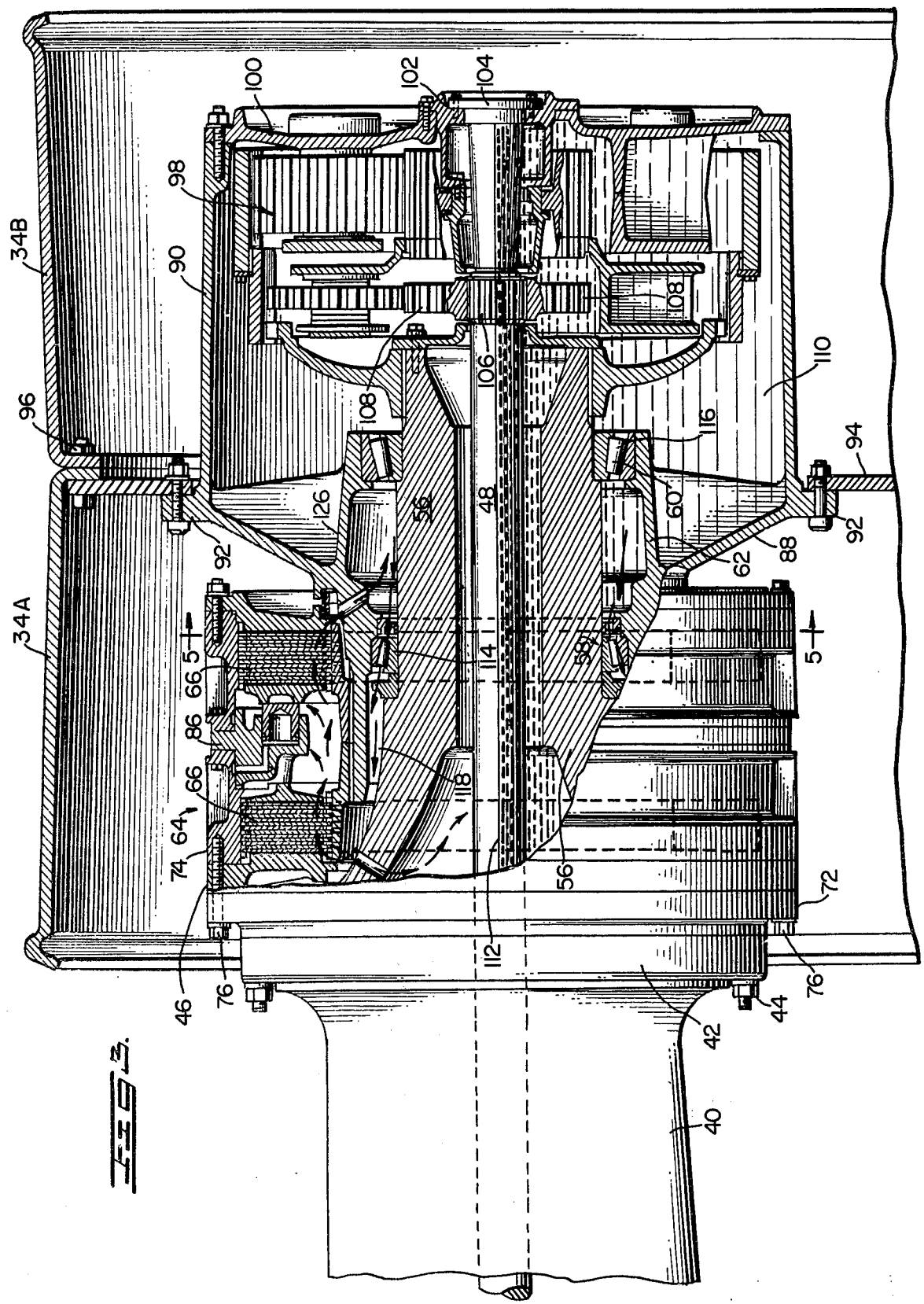
FIG. 3 is an enlarged fragmentary view, with parts broken away, and partially in section, of a wheel final drive assembly and system, and with multiple oil immersed disc brake mechanism associated therewith being shown in detail, and with cooperating associated components.

Referring now in detail to the drawings, there is shown in FIG. 1, and generally designated 10, a wheeled front end loader which includes an engine compartment assembly 12, a bumper 14, an operator's platform 16 having a guard rail 18, an operator's cab 20, a bucket of a general type 22 operable through hydraulic piston and cylinder means generally shown at 24, and an access ladder 26 to the operator's platform. The vehicle is equipped with wheel and tire units or assemblies 28 and 30. The vehicle is a structure manufactured by the assignee of this application.

Wheel loaders manufactured by the assignee company, of a type to which the present invention is applicable, are generally discussed herein to serve as a background for the present invention, and to show desirability of the present invention. The vehicles are of substantial size and weight, and the dimensions and specifications play a substantial part in the features of the present invention.

Referring to FIG. 2 of the drawings, each of the wheel assemblies, only one of which will be described in detail, includes tire 32 mounted on a split rim 34, the wheel being generally designated 36. Each of these wheels, four in a four wheel drive unit, or at least two, in types of vehicles with which the invention is associated, will generally be separately driven from a power train through a differential, the housing of which is designated 38, and from which extends a hollow differential axle housing 40 terminating in end flanges 42, bolted at 44 to a wheel brake hub 46.

Axle drive shafts 48, shown in dotted lines, extend through the housing 40 to each wheel drive assembly, and each axle drive shaft 48 at its inner end is joined telescopically with a hub of a side gear of the differential, not shown. The axle drive shaft has a splined shaft end which is slidably engaged with internal splining of a side gear hub in a known type of differential.

An axle shaft support and housing member 56 is operatively secured to the hub, and has a central opening through which the axle shaft 48 extends. This support or housing 56 is stationarily affixed to the hub, and by means of tapered bearing assemblies, generally designated 58 and 60, rotatably mounts a rotatable hub 62 in spaced relationship to the housing and defining a passage therebetween.

A disc brake assembly generally designated 64, partially shown in FIG. 3, and in somewhat enlarged detail in FIG. 4, includes a plurality of brake discs arranged in multiple brake disc packs in a back to back arrangement.

The individual brake disc packs are shown at 66 and will be described in greater detail hereinafter. Suffice it to say at this point that fixed discs 68 in each pack are attached by splining at 70 to fixed brake hub portions 72, 74 attached by bolts 76 to one another and to stationary housing 56. Coacting discs 78 are splinedly connected at 80 to support members 82, which in turn are mounted for rotation with the rotatable hub member 62 by splining at 84, and therefore these coacting or rotating discs revolve with the wheel. Means generally indicated at 86 are utilized for operatively engaging the two sets of discs and, as appears in a separate copending patent application of the present applicant, entitled A Double Disc-type Brake System, Ser. No. 879,306, filed Feb. 21, 1978, are operative in a serial arrangement to initially apply the brakes in one brake pack, and subsequently, when a greater braking force is desired, the second brake disc pack is energized.

The rotatable hub 62 includes a bell shaped portion 88 and an annular portion 90. A peripheral ring 92 mounts and supports a rim mounting ring 94, the split rim sections 34A, 34B being interconnected by nut, bolts at 96, and which further connect the so joined rim sections to the mounting ring 94.

Operatively mounted within, generally speaking, the annular section 90 is a double stage or double planetary reduction gearing system generally designated 98, and which in effect is a final drive reduction system. The outer opening in the annular section 90 is closed by means of removable hub plate 100, an outer hollow tub member 102, constituting a removable part of a double separable hollow hub utilized in the final drive assembly, and a removable spacer plug 104.

The gearing in the final drive reduction assembly is described and claimed in greater detail in my copending application entitled Wheel Final Drive Assembly Ser. No. 879304, filed Feb. 21, 1978, to which reference is made herein, the structure, insofar as applicable to the present invention, being incorporated herein by reference. Generally speaking, however, the drive axle shaft 48 operatively interconnects a vehicle power train drive differential, shown at 38, with the final drive assembly by means of a splined end 106 on the axle shaft operatively engaged in an internal splined hub of a primary sun gear 108 in the double reduction final drive gearing assembly.

This final drive assembly and the rotatable hub sections, as also the structure within which the brake disc packs are embodied, in effect collectively constitute a closed assembly. The stationary hub, and bearing assembly interconnections between the stationary and rotary hub portions are contained within the structure, and the structure overall basically defines an oil sump or reservoir 110, in the bottom portion of the closed casing. The sump contains lubricating and cooling oil, extending substantially up to the center line of axle shaft 48, as indicated at 112. It will be seen from FIG. 3 that the lower portion of the final drive assembly, the gears and carrying members therefore and, generally speaking, the lower half of the stationary and rotatable hub portions likewise are immersed in the oil in the reservoir.

In some previously used and known structures this immersion in lubricating and cooling oil, and associated mechanism including passageways or oil supplying bores, insured, in an oil flooded disc brake enclosed within the wheel of the wheel loader final drive, circulation of cooling and lubricating oil within cavities, to, through and around the disc brake packs and individual discs to lubricate and maintain temperatures at desired levels. Such apparatus is shown in the aforementioned Cole et al U.S. Pat. No. 3,301,359 to which reference is made for such details.

The present invention however, is directed to mechanism incorporated in large vehicles which, due to weight, size, and speed of movement, necessitate an enlarged or multiple brake system, and difficulties are encountered in providing sufficient cooling and lubricating oil flow in and to cavities and the disc packs. In devices such as shown in the Cole patent the oil, to a substantial extent, has no flow by itself. Referring to the Cole patent, oil is introduced through a passageway from an external source, and thereafter circulated through the disc packs and other portions of the device.

In the present invention, however, a different system is utilized which does not include external pumping means, and where, due to slow rotational speed of the wheel, and accordingly portions of the rotating hub within the oil sump, it is difficult to create a sufficient amount of turbulence to provide adequate lubrication and cooling flow of the oil. It is difficult to get this cooling and lubricating oil to circulate within the cavities within which the parts to be cooled and lubricated are mounted, without such external pumping means, due to this slow movement.

As mentioned, the oil in the sump or reservoir 110 in the structure shown, does not have any worthwhile flow by itself. Turbulence due to rotation of the wheel, and therewith the rotating hub portion 62, around and with respect to the stationary axle shaft support and housing 56, will cause some oil to be accessible in the upper region of the case, and the various gearings and portions being totally immersed in oil at the lower half will carry or throw oil, but to a limited degree only because of the slow movement of rotation. It has been found that tapered roller bearings 114, such as in the tapered bearing assembly 58, and to a degree the tapered roller bearing 116 in bearing assembly 60, cause some limited oil flow, and additionally serve to increase the turbulence acquired due to rotation. This oil flow however, in and of itself, and the turbulence, and conveyance or throwing oil by rotation, is inadequate for the purposes of cooling and lubricating the present system.

In order to overcome these difficulties, a rotating vaned pump ring, and which constitutes an essential part of the present invention, is provided and is located close to the smaller end of the tapered roller bearings and, as will appear hereinafter, the vanes of the pump ring operate in a manner to guide and positively pump oil from the reservoir into and through a passage between the fixed and rotating parts, the roller bearing assembly, and into the brake containing areas or cavities, whereafter it can flow to, through and around the brake pack discs, as also will appear hereinafter.

Reference is now made to FIG. 4 of the drawings showing in greater detail the brake packs, the discs, and associated mechanism. The axle shaft support and housing 56 is stationary and the rotatable hub fragmentarily and generally indicated at 62, is rotatable with the interposition of bearing assemblies 58 and 60, only one of which is shown in this figure. The bearing assembly is located in a passage 118 formed between the stationary housing and rotating hub portion, with the inner race 120 being fixed and the outer race 122 being rotatable with the rotating hub portion 62. A ring shaped stop member 124 contacting housing 56 and inner race 120 positions the inner race, and stop means are provided in the nature of a shoulder at 125 on rotating hub 62 against which the outer race is seated. The tapered roller bearings 114 are, as usual, operatively disposed between the inner and outer races.

Between the two bearing assemblies 58, 60 there is an annular open ended chamber defined externally by the solid hub portion 126 and the bell shaped portion 88, and which at its end, due to the bearing assembly 60, is open to the reservoir 110 and oil therein. As mentioned hereinbefore, rotation of the hub within the oil creates a turbulence, and this, in conjunction with the tapered roller bearings 114, causes some limited oil flow therethrough, and into the passageway 118 as indicated by arrow 128. The amount of the oil flow, however, is insufficient to provide adequate flow into what constitutes a brake pack cavity including the enlarged cavity or chamber area 130, from whence it can flow through radial passages 132, formed in the support member or rotor 134. The amount of flow is operationally inadequate, however, to forcefully move the oil as required through the discs and disc packs.

The generally designated fixed brake hub portion 72 in effect includes a back plate 136 and stator 74 bolted thereto, and to a common brake actuator ring 137 at 138. Details of this structure are disclosed in my Brake System application. Brake actuator pressure plates 140 and 142 are movable by oil under pressure in the hydraulic brake system. The oil passes through annuluses 144 and 146, into passageways 148 in actuator ring 137 to move pistons 152, 154, which move pressure plates 140, 142, and therethrough compress the discs in a known manner for applying braking pressure. The opening 150 is a lightening recess or relief. The selective passage of the brake fluid through the annulus members 144, 146 to selectively actuate the inner and outer disc packs is more specifically shown in the aforementioned copending patent application, directed to the Brake System, and the details will not be further described herein.

Attention is invited to seals 156 in the nature of O-rings, between the housing 56, hub portion 72, and portion 74, as also similar seals between actuator ring 137 and stator 74. Sealing relation between the disc brake assembly and the wheel hub generally, is accomplished by providing a seal "S" including similarly shaped rings 158 held in contact by elastomeric O-rings 160. These various seals in conjunction with others shown, in effect define within the mechanism a closed cavity or chamber within which the brake disc packs are operatively located. The space is generally indicated at 162, containing and positioned between the brake disc packs, and below and between the brake actuator mechanism.

In order to overcome the problem of insufficient oil flow, the present invention utilizes a rotating vaned pump ring 164, positioned between the exterior of the rotatable hub member 62 and the exterior of the axle housing 56, and proximate the smaller ends of the roller bearings 114 in bearing assembly 58, all as more clearly shown in FIG. 4. This ring 164 has a press fit engagement with the rotatable hub 62 at 166. Details of this vaned pump ring will be described more fully with respect to FIGS. 5-8 inclusive. The function of the ring, however, is to positively pump oil into and through the bearing assembly 58, as indicated by arrows 168, from sump into the passage 128, the enlarged cavity 130, radially through radial openings 132, and then to, through, and around the brake discs in the brake packs and into and through space 162. In turn the oil is recycled through return passages 170, 172, as indicated by arrows 174 and 176, respectively, to the sump or reservoir. The general flow paths are indicated by the plurality of arrows, and passages or openings are provided, as required, in various portions and members of the structure to insure passage of the oil therearound.

The pump ring 164 is slightly spaced axially from bearing assembly 58 to promote free flow therethrough, and around therebetween and fixed housing 56.

Referring to FIG. 5 of the drawings, it is seen more clearly that the ring 164 is positioned between the fixed housing 56 and rotatable hub member 62, and in press fit engagement with the rotatable hub 62 as above set forth. The pump ring includes outer and inner ring members 178, 180, and positioned therebetween are a plurality of pumping vanes which are arranged in reverse or opposite angular directions in successive sectors of the pump ring. The vanes 182, in one 60° sector, as shown, are so angularly disposed with respect to a direction of rotation indicated by arrow 184, to pump oil when the pump ring moves in that direction. The sectors of reversal of direction can vary between, for example, 45° and 60°, but are shown in FIG. 6 in 60° sectors. The vanes 186, in a succeeding sector, are at an angled position to pump oil when the ring is moving in the direction of arrow 188. Sector divider vanes 190, having double sloping surfaces, are disposed between the sectors and insure proper reversing of the pump action, and these reversing vanes serve additionally to eliminate dead spaces or areas. It will be noted that, spaces are provided at 192, between the vanes.

FIG. 7 shows a cross-sectional view through one of the divider vanes 190, along line 7—7 of FIG. 5, and FIG. 8 is a cross-sectional view through one of the vanes 192. The vanes are, in effect, hooked on to the inner and outer races or ring members 178, 180.

From FIG. 5 it is seen that the bottom of the pump ring 164 is immersed in the oil, the oil level being indicated. When the pump ring 164 rotates as the wheel rotates, due to its being attached to the rotating hub 62 then, independent of the direction of rotation, it forces oil into and through the tapered roller bearings and into the cavity therebeyond, where it can flow into, through and around the disc brakes. By alternating the direction of the vanes in sectors, as described, the pump ring will function in either direction of rotation of the wheel, as indicated by arrows 196, 198, the reverse disposition of the vanes in the sectors being indicated. The pump ring will, naturally, drive primarily or more efficiently when immersed in oil, i.e., immersed below the oil level, whereas above the oil level, there will be a lighter oiling, which will to some degree result from the turbulence created and oil carried by the rotating members. Regardless of the direction of rotation however, dependent upon whether the vehicle is moving forwardly or in reverse, the pump ring will be effective to pump oil into and through the brake system and packs, whereby adequate lubrication and cooling is accomplished. After having passed through the packs the oil will return through the passages 170, 172.

The angular disposition of the vanes, in conjunction with the direction of rotation of the pump ring will directionally impell oil toward the smaller ends of the tapered bearings, and through in an amount to efficiently lubricate and cool the brake discs and associated mechanism.

An additional feature of the invention resides in the fact that the bearings 114, in the bearing assemblies 58, function as check valves against return passage of oil during the passage of non-pumping vane segments. In other words, a positive driving of the oil takes place through the bearings only during that segment of pump rotation where the vanes are pumping oil toward the bearings, but prevents return of oil when vanes in the opposite direction are passing by the bearings.

In addition to the positive pumping caused by the vaned pump ring, these rings increase the amount of turbulence to facilitate dispersion of oil. The invention insures adequate circulation of the cooling and lubricating oil within the cavities, and in and about the brake disc packs, without external pumping means, the oil flow being increased internally.

The overall operation of the invention will be apparent from the foregoing description, reference being made to the accompanying drawings. Increased efficiency in cooling and lubricating of the brakes is obtained and this in turn reduces problems including overheating of brake discs and related structure, brake disc burning, immature failure due to heat and water, and additionally diminishes structural and operational problems which might otherwise occur due to the substantial heat generated by the mechanisms.

Manifestly, minor changes in details can be effected without departing from the spirit and scope of the invention as defined in, and limited solely by, the appended claims.

What is claimed is:

1. In an oil flooded disc brake operatively positioned within an oil containing vehicle drive wheel, a stationary member, a rotatable wheel carrying member, bearing means rotatably interconnecting said members with an oil passage therebetween, said members respectively mounting coacting interleaved stationary and rotatable brake discs conjointly constituting a brake disc pack, said members spacedly defining therebetween a brake disc pack cavity, said pack being operatively positioned in said cavity, a vaned oil pump ring operatively positioned in said oil passage, partly immersed in oil, and connected to said rotatable member for rotation therewith, said oil pump ring upon rotation forcing oil to flow through said bearing means and said passage, into and through said cavity, and said disc pack, to lubricate and cool said discs.

2. In an oil flooded disc brake as claimed in claim 1, said vaned oil pump ring including a plurality of vanes, some said vanes being angularly disposed in a direction operable to directionally impel oil in the direction of said passage during rotation of said ring in a first direction of, and with, the vehicle wheel, and others of said vanes being angularly disposed in a direction operable to directionally impel oil in the direction of said passage during rotation of said ring in a second direction of, and with, the vehicle wheel rotating in a direction opposite to the first direction.

3. In an oil flooded disc brake as claimed in claim 2, said vanes being arranged in groups of the same angular dispositions in peripheral successive sectors of said ring.

4. In an oil flooded disc brake as claimed in claim 3, said sectors consisting of between approximately 45° and 60°, and the angular dispositions in the succeeding sectors being respectively reversed in an alternating arrangement.

5. In an oil flooded disc brake as claimed in claim 4, further including sector divider vanes interposed on the periphery of said ring between successive sectors and having double sloping surfaces, each sloping surface being at the same angle as a vane in the adjacent sector, said sector divider planes being operable to insure proper reversing of the pumping action and additionally eliminating areas of non-pumping of said ring.

6. In an oil flooded disc brake as claimed in claim 5, said vaned pump ring including two axially spaced edge rings with said vanes being disposed between and connected to the edge rings, said vanes being in spaced relationship around the periphery of said ring and providing open spaces therebetween for facilitating oil flow and pumping actions.

7. In an oil flooded disc brake as claimed in claim 6, wherein said bearing means consist of tapered roller bearings with the smaller ends of the tapered bearings being disposed toward said pump ring, said bearing assemblies being functionally operable as check valves against return passage of oil during passage thereby of non-pumping vane segments.

8. In an oil flooded disc brake as claimed in claim 7, said member mounting said rotatable brake discs comprising a rotor splinedly mounting said rotatable brake discs thereon, said rotor being disposed at the outer end of said oil passage and having a plurality of radial holes therethrough, oil being impelled into and through said passage, and thence passing radially through said holes into and through the brake discs of said disc pack.

9. In an oil flooded disc brake as claimed in claim 8, said stationary member including a fixed axle shaft housing through which a driven axle shaft passes and is operatively connected to said vehicle drive wheel for rotation thereof, said housing having an oil return passageway therethrough proximate the outer end of said rotor and an end of said disc pack, and operable to return oil to a reservoir of the same.

10. In an oil flooded disc brake as claimed in claim 8, said rotatable brake disc mounting member having a passageway therethrough proximate an end of said disc pack for returning oil from said cavity after flowing into said cavity, said disc pack, and thence to oil reservoir for recycling.

11. In an oil flooded disc brake as claimed in claim 1, further including two separate brake disc packs arranged in a back to back relationship and both said disc packs being operatively positioned in said brake disc pack cavity, said rotatable wheel carrying member including a rotor operatively connected thereto, and the opposite ends of said rotor mounting said rotatable brake discs thereon, a part of said brake disc pack cavity being disposed between said brake disc packs and containing means for functionally operating each disc brake pack, the flow of oil into and through said cavity also flowing through each said disc pack to lubricate and cool the discs therein, and subsequently being returned to an oil reservoir within said drive wheel.

12. In an oil flooded disc brake as claimed in claim 11, said vaned oil pump ring including a plurality of vanes, some said vanes being angularly disposed in a direction operable to directionally impel oil in the direction of said passage during rotation of said ring in a first direction of, and with, the vehicle wheel, and others of said vanes being angularly disposed in a direction operable to directionally impel oil in the direction of said passage during rotation of said ring in a second direction of, and with, the vehicle wheel rotating in a direction opposite to the first direction.

13. In an oil flooded disc brake as claimed in claim 12, said vanes being arranged in groups of the same angular dispositions in peripheral successive sectors of said ring.

14. In an oil flooded disc brake as claimed in claim 13, said sectors consisting of between approximately 45° to 60°, and the angular dispositions in the succeeding sectors being respectively reversed in an alternating arrangement.

15. In an oil flooded disc brake as claimed in claim 14, further including sector divider vanes interposed on the periphery of said ring between successive sectors and having double sloping surfaces, each sloping surface being at the same angle as a vane in the adjacent sector, said sector divider planes being operable to insure proper reversing of the pumping action and additionally eliminating areas of non-pumping of said ring.

16. In an oil flooded disc brake as claimed in claim 15, said vaned pump ring including two axially spaced edge rings with said vanes being disposed between and connected to the edge rings, said vanes being in spaced relationship around the periphery of said ring and providing open spaces therebetween for facilitating oil flow and pumping actions.

17. In an oil flooded disc brake as claimed in claim 16, wherein said bearing means consist of tapered roller bearings with the smaller ends of the tapered bearings being disposed toward said pump ring, said bearing assemblies being functionally operable as check valves against return passage of oil during passage thereby of non-pumping vane segments.

18. In an oil flooded disc brake as claimed in claim 17, said member mounting said rotatable brake disc comprising a rotor splinedly mounting said rotatable brake discs thereon, said rotor being disposed at the outer end of said oil passage and having a plurality of radial holes therethrough, oil being impelled into and through said passage, and thence passing radially through said holes into and through the brake discs of said disc pack.

19. In an oil flooded disc brake system enclosed within a vehicle final drive wheel, a stationary axle shaft housing, stationary brake disc support means mounting the discs thereon and being attached to said stationary axle shaft housing, said support means and said axle shaft housing conjointly defining a brake disc pack cavity, a rotatable brake disc support means operatively connected to said drive wheel and extending into said brake disc pack cavity and mounting thereon the rotatable brake discs, a tapered roller bearing assembly rotatably mounting said rotatable brake disc support means on, and radially spaced from said stationary axle shaft housing, the spacing defining an oil passage into said brake disc pack cavity, said stationary and rotatable brake discs being interleaved and forming a brake disc pack operatively mounted in said brake disc pack cavity, a vaned oil pump ring attached to, and rotatable with, said rotatable brake disc support means and positioned in said oil passage, said vaned pump ring upon rotation positively guiding and impelling oil to flow through said oil passage into said brake disc pack cavity, thence into, through, and around the discs, and thereafter discharged for recycling.

20. In an oil flooded disc brake as claimed in claim 19, said vaned oil pump ring including a plurality of vanes, some said vanes being angularly disposed in a direction operable to directionally impel oil in the direction of said passage during rotation of said ring in a first direction of, and with, the vehicle wheel, and others of said vanes being angularly disposed in a direction operable to directionally impel oil in the direction of said passage during rotation of said ring in a second direction of, and with, the vehicle wheel rotating in a direction opposite to the first direction.

21. In an oil flooded disc brake as claimed in claim 20, said vanes being arranged in groups of the same angular dispositions in peripheral successive sectors of said ring.

22. In an oil flooded dics brake as claimed in claim 21, further including sector divider vanes interposed on the periphery of said ring between successive sectors and having double sloping surfaces, each sloping surface being at the same angle as a vane in the adjacent sector, said sector divider planes being operable to insure proper reversing of the pumping action and additionally eliminating areas of non-pumping of said ring.

23. In an oil flooded disc brake system enclosed within a vehicle final drive wheel, means defining a sealed oil containing casing within said wheel, a stationary axle shaft housing in said casing, a rotatable hub in said casing, a tapered roller bearing assembly rotatably mounting said rotatable hub on said axle shaft housing with an oil passage therebetween, a stationary brake disc mounting means attached to and radially spaced from said axle shaft housing and defining therebetween a brake disc pack cavity, a rotatable brake disc mounting means attached to said rotatable hub and positioned within said brake disc pack cavity, coacting brake discs on said respective stationary and rotatable disc mounting means constituting a brake disc pack operatively mounted within said brake disc pack cavity, a vaned oil pump ring positioned in said oil passage, proximate said roller bearing assembly, and attached to said rotatable hub for rotation therewith, said pump ring upon rotation directing oil to flow through said bearing assembly, and said passage into and through said brake disc pack cavity for immersing said brake discs in a flow of oil therein for lubrication and cooling.

24. In an oil flooded disc brake as claimed in claim 23, said vaned oil pump ring including a plurality of vanes, some said vanes being angularly disposed in a direction operable to directionally impel oil in the direction of said passage during rotation of said ring in a first direction of, and with, the vehicle wheel, and others of said vanes being angularly disposed in a direction operable to directionally impel oil in the direction of said passage during rotation of said ring in a second direction of, and with, the vehicle wheel rotating in a direction opposite to the first direction.

25. In an oil flooded disc brake as claimed in claim 24, said vanes being arranged in groups of the same angular dispositions in peripheral successive sectors of said ring.

26. In an oil flooded disc brake as claimed in claim 25, further including sector divider vanes interposed on the periphery of said ring between successive sectors and having double sloping surfaces, each sloping surface being at the same angle as a vane in the adjacent sector, said sector divider planes being operable to insure proper reversing of the pumping action and additionally eliminating areas of non-pumping of said ring.

* * * * *